Sept. 7, 1965 R. K. CADWELL 3,204,808
MAGNETIC FLOATING ROOF SEAL
Filed Sept. 17, 1962
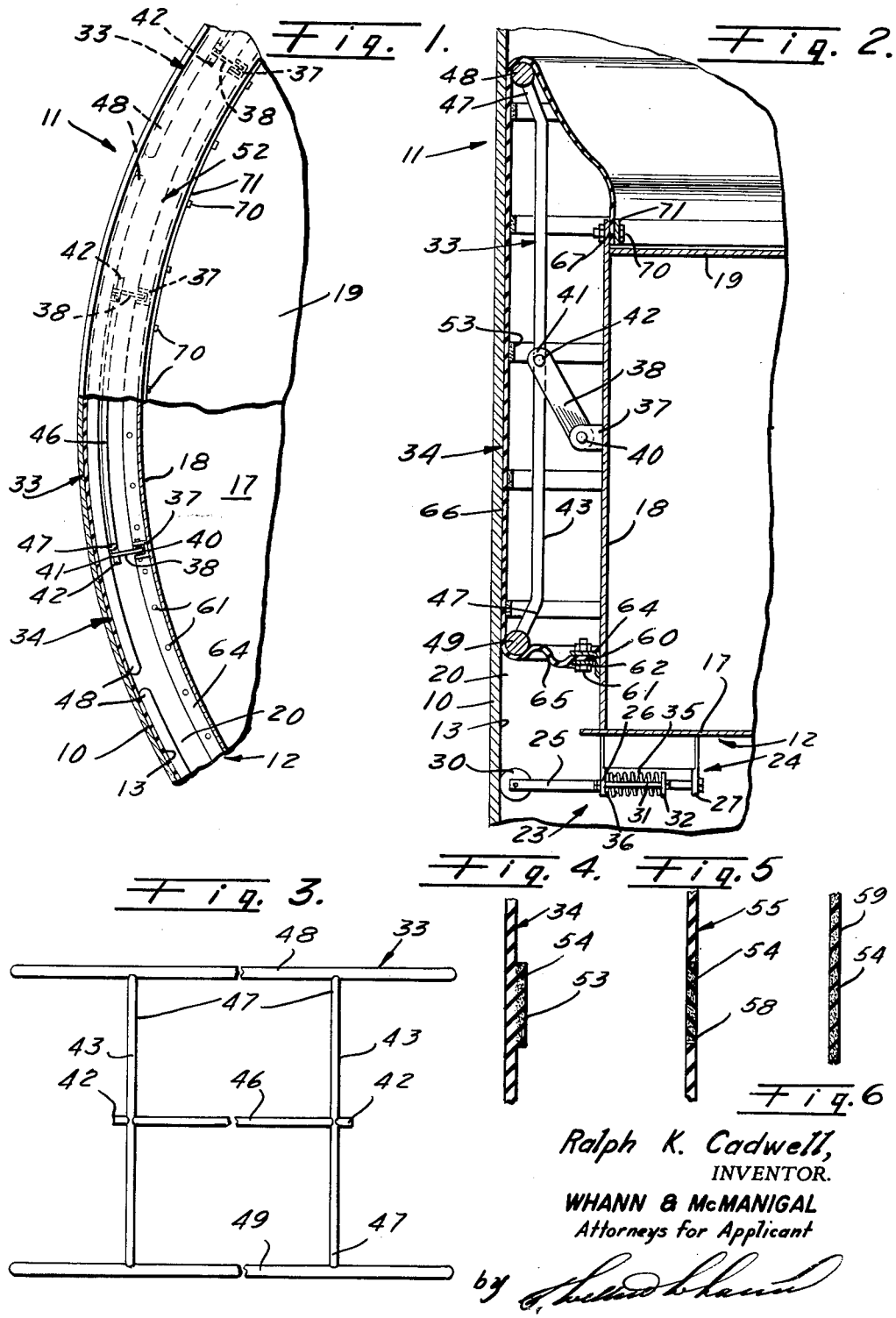
Ralph K. Cadwell,
INVENTOR.
WHANN & McMANIGAL
Attorneys for Applicant United States Patent Office 3,204,808
Patented Sept. 7, 1965

3,204,808
MAGNETIC FLOATING ROOF SEAL
Ralph K. Cadwell, Los Angeles, Calif., assignor to Lacy Manufacturing Company, Los Angeles, Calif., a corporation of California
Filed Sept. 17, 1962, Ser. No. 224,068
2 Claims. (Cl. 220—26)

This invention relates to a sealing means for a floating roof type storage tank and, more particularly, to a seal of flexible material for sealing the annular space between the tank and roof and which is adapted to cling to the inside surface of the wall of the tank, as the floating roof rises and falls.

Tanks having floating roofs are usually large and are used to store petroleum products, liquid chemicals and, generally speaking, inflammable liquids. Hence, the desirability of the floating roof.

The roof is somewhat smaller in diameter than the interior of the tank and, thus, there is an annular gap between the exterior of the roof and the inner wall surface of the tank. The space or gap between the floating roof and the tank wall is sealed against the escape of product vapors or the entrance of foreign matter from above the roof.

In the prior art, these seals have presented substantial problems in that as the tanks are generally quite large, the inner wall of the tank rarely has a true circular form and usually has many substantial irregularities.

It is an object of the invention to provide an improved seal for tanks of the type having floating roofs.

It is another object of the invention to provide a seal for the annular space between a tank and its floating roof and which forms a good closure irrespective of irregularities in the inner surface of the tank.

It is still another object of the invention to provide a seal of the type described in the preceding paragraph and which can be economically made to extend vertically for a substantially longer distance than the prior art seals. By having the seal extend over a larger area, a more dependable closure results and the deformities in the inner wall of the tank presesnt much less of a problem.

It is a further object of the invention to provide a seal of the type described in the preceding paragraphs in which liquids are not required.

It is a still further object of the invention to provide a seal for a floating roof type tank in which the seal haas a maximum of flexibility and a maximum of adherency to the inner surface of the tank.

It is another object of the present invention to provide a seal of the type described in the preceding paragraph and which is of simple and economical construction.

It is still another object of the invention to provide a seal for a floating roof in which the seal is forced into contact, adjacent its vertical ends, with the inner wall surface of the tank by a weight member and in which the entire outer vertical surface of the seal is caused to cling to the wall of the tank by magnetic means.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is a fragmentary, partially cross sectioned plan view of a cylindrical tank having a floating roof and a seal between the roof and the inner surface of the wall of the tank, according to the invention;

FIG. 2 is a fragmentary side elevational cross sectional view of the tank roof and seal shown in FIG. 1;

FIG. 3 is an elevational view of a seal positioning frame;

FIG. 4 is an enlarged fragmentary side elevational view of the sealing sheet, shown in FIG. 2, and having permanent magnetic particles impregnated in horizontally directed strips, embedded with the sheet;

FIG. 5 is a fragmentary elevational cross sectional view of a sealing sheet having permanent magnetic particles impregnated within spaced strips which are formed as part of the sheet; and FIG. 6 is an elevational cross sectional view showing a portion of a sealing sheet having permanent magnets embedded throughout the sheet.

Referring again to the drawings, there is shown a vertical cylindrical wall 10 of a tank 11, having a floating roof 12. The tank wall 10 is made of magnetic material, generally steel, and has an inner cylindrical vertical surface 13.

The floating roof 12 has a flat circular bottom 17, a vertical cylindrical wall or rim plate 18, and a flat circular top deck 19. The roof 12 is sealed so as to float in liquid in the tank. The diameter of the rim plate 18 is somewhat smaller than the diameter of the tank wall 10 so that an annular space 20 is provided therebetween.

In order that the floating roof be maintained centrally within the tank, centering devices 23 are provided on the roof bottom, extending radially outwardly and circumferentially spaced around the roof. The centering devices are comprised of a frame member 24 secured to the bottom of the roof and having extending therethrough a rod 25 slidably supported by frame members 26 and 29. At the outer end of the rod 25 is a vertically directed roller 30, positioned to roll up and down on the inner surface 13 of the tank as the roof rises and falls with the liquid level. Supported by frame member 26 are a pair of horizontally spaced bolts 31 which, in turn, support a flange 32, and spaced from flange 32 by means of coil spring 35 is a flange 36 secured to rod 25 and adapted to be moved radially inwardly against the force of the spring when a portion of the roof moves radially toward the tank wall 10. When the latter occurs, the springs 35 in the respective centering devices resist such movement so as to tend to hold the respective rods 35 in their extended positions, the roof being in the approximate center of the tank.

Extending radially outwardly of the roof are a plurality of circumferentially spaced seal positioners, generally designated as 33, adapted to hold an endless, sheet seal, generally designated as 34, in a proper sealing position on the inner surface 13 of the tank wall.

Secured to and extending outwardly from the roof rim plate 18 are pairs of circumferentially spaced link brackets 37 in which seal positioner links 38 have their lower ends 40 pivotally engaged to connected the positioner to the roof. The upper ends 41 of the links 38 are pivotally engaged with positioner pivot pins 42, extending horizontally in opposite directions from spaced, vertical rods 43 and forming extensions of horizontal rod 46 joining the two vertical rods 43. The rod 46 and the pins 42 lie on a curve which is substantially concentric to the tank wall 10 and the rim plate 18.

The rods 43 are bent outwardly adjacent their ends and have outwardly directed end portions 47 extending from the bends. Secured to the upper end portions 47 is an upper seal contact rail 48 and secured to the lower end portions 47 is a lower seal contact rail 49. The rails 48 and 49 are also curved so as to be substantially concentric with the wall 10 of the tank and the rim plate 18 of the floating roof, as shown in FIG. 1. Since the portions 47 on the rods 43 extend outwardly of the pivots 42, the weight of the rails 48 and 49 on their ends and the frame provide a constant downward force on the link 38, resulting in the rails 48 and 49 being forced outwardly against the seal 34 to the extent of the annular space 20. The latter space is always narrower than the length of the link 38 and, thus, the link is never permitted to extend outwardly far enough to become horizontal and always has the end 41 in the upper position. By having the contact rails 48 and 49 of a heavier construction than the other parts of the seal positioner, additional downward and outward force is provided.

The sheet 34 of liquid and gas impervious material forms the seal between the outer surface of the rim plate 18 and the inner surface 13 of the wall of the tank, extending across the gap 20 and annularly for 360°. As stated above, the seal is endless, being made of one piece, or may be made to be effectively endless by having its opposite ends sealingly secured together. It is preferably made of an elastomeric material, such as neoprene or Koroseal, or may be made of any flexible, wear resistant plastic material which is not acted upon chemically by the product stored in the tank.

Three embodiments of the seal material are shown in FIGS. 4, 5 and 6, that in FIG. 4 being an enlargement of the embodiment shown in FIG. 2. In order that the sheet cling to the inner surface 13 of the magnetic wall of the tank, the sealing sheet is impregnated with permanent magnets 54 as necessary to obtain the desired result. The form of sheet shown in FIGS. 2 and 4 is made of an elastomeric material having vertically spaced strips 53, extending circumferentially around the entire sheet. The strips 53 are of the same material as the remainder of the sheet and are integrally bonded thereto, having the permanent magnets 54 impregnated therein, the magnets being in a conventional form so that the sheet will retain its flexibility. The strength of the magnets and the spacing of the strips 53 should be such as to support the sheet against a vertical metallic surface, such as the tank wall 10.

In FIG. 5, a sheet of elastomeric material 55 has the permanent magnets 54 within strips 58 of the same material as the sheet and integral and flush therewith.

In the embodiment shown in FIG. 6, a sheet 59 of elastomeric material has the permanent magnets 54 impregnated therein throughout the entire sheet.

Referring to FIG. 2, the seal 34 has its lower circumferential edge 60 sealingly secured, by means of bolting bar 62 and circumferentially space bolts 61, to a circumferential seal band 64, which in turn is sealingly secured to the outer surface of the rim plate 18. Extending radially outwardly from the lower edge 60 is a substantially horizontal portion 65 of the seal. From this portion, the seal extends around the lower ends of the contact rails 49. Extending upwardly from the rails 49 is a vertical portion 66 of the seal being held in contact with the inner surface 13 of the tank wall by means of the permanent magnets in the strips 54. The top of the seal extends over the contact rails 48 downwardly and inwardly so that its upper circumferential edge 67 extends inwardly to the upper end of the rim plate to which it is sealingly secured by bolting bar 71 and circumferentially spaced bolts 70.

As previously indicated, since the contact rails 48 and 49 are offset outwardly from the pivots 42, the force of the rails 48 and 49 is downwardly and outwardly so as to bring the upper and lower portions of the seal, outwardly of the contact rails, into contact with the inner surface of the tank wall. The seal material itself has substantial weight so that it will tend to be taut between the rails 48 and 49 as it is held along its entire outer face 66, in slidable but sealing contact, with the wall surface 13 by means of the permanent magnets and the closely spaced positioners.

Because of its flexibility, it will conform to an irregularities in the tank and will seal around them as it is held against all portions of the wall surface by the permanent magnets. As the liquid level changes and the roof is raised or lowered, the seal positioner maintains substantially the same relative position to the seal, and the seal slides along the wall surface 13, the weight of the roof overcoming the force of the magnets with respect to vertical movement, but not so as to break the seal between the tank wall and the portion 66 of the sheet.

If the roof is moved off center, the various rails 48 and 49 will be moved inwardy or outwardly as the positioners move on the respective links 38 as they pivot, but the rails' weight will, in any event, force them downwardly and outwardly so as to maintain the seal sheet in contact with the surface 13.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. In a tank having a vertical cylindrical wall of magnetic material and having a floating roof annularly spaced from the inner surface of the wall, a seal forming a closure between said roof and said tank in the annular space therebetween, said seal comprising:

a sheet of flexible elastomeric material having permanently magnetized material integral therewith and formed to be effectively circumferentially endless, said sheet having upper and lower portions of vertically spaced edges sealingly secured to respective upper and lower portions of said roof;

annularly spaced positioners extending outwardly of said roof intermediate of said sheet edges to position a substantial portion of the outer surface of said sheet in slidable sealing contact with the inner surface of the wall of said tank;

each positioner having a pair of vertically spaced, generally horizontal members, said horizontal members being curved to conform to said tank wall and being in contact with the inner surface of said sheet;

a vertical member connecting each pair of respective horizontal members; and links, each having an upper end pivotally connected to a respective vertical member and having a lower end pivotally connected to said roof, said horizontal members having weighted portions thereof extending radially outwardly of said connections to force said positioners downwardly and outwardly on said links.

2. In a tank having a vertical cylindrical wall of magnetic material and having a floating roof annularly spaced from the inner surface of the wall, a seal forming a closure between said roof and said tank in the annular space therebetween, said seal comprising:

a sheet of flexible material having permanently magnetized material integral therewith, said sheet being formed to be effectively circumferentially endless, said sheet having upper and lower portions of vertically spaced edges sealingly secured to respective upper and lower portions of said roof;

annularly spaced positioners extending outwardly of said roof intermediate of said sheet edges to position a substantial portion of the outer surface of said sheet in slidable sealing contact with the inner surface of the wall of said tank;

each positioner having a pair of vertically spaced, generally horizontal members, said horizontal members being curved to conform to said tank wall and being in contact with the inner surface of said sheet;

a vertical member connecting each pair of respective horizontal members; and links, each having an upper end pivotally connected to a respective vertical member and having a lower end pivotally connected to said roof, said horizontal members being weighted outwardly of said link connections so as to force said positioners downwardly and outwardly toward said tank wall, each upper end of said links being maintained above its respective lower end.

References Cited by the Examiner

UNITED STATES PATENTS

| | | | |
|---|---|---|---|
| 2,536,019 | 1/51 | Allen | 220—26 |
| 2,537,986 | 1/51 | Goldsby et al. | 220—26 |
| 2,647,654 | 8/53 | Cibulka | 220—26 |
| 2,650,738 | 9/53 | Ulm | 220—26 |
| 3,033,413 | 5/62 | Fino et al. | 220—26 |

THERON E. CONDON, *Primary Examiner.*

EARLE J. DRUMMOND, *Examiner.*